United States Patent
Fuse et al.

(10) Patent No.: US 10,055,456 B2
(45) Date of Patent: Aug. 21, 2018

(54) INFORMATION PROCESSING APPARATUS AND NON-TRANSITORY COMPUTER READABLE MEDIUM FOR DISPLAYING AN INFORMATION OBJECT

(71) Applicant: FUJI XEROX CO., LTD., Tokyo (JP)

(72) Inventors: Toru Fuse, Yokohama (JP); Zhihua Zhong, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 400 days.

(21) Appl. No.: 14/656,239

(22) Filed: Mar. 12, 2015

(65) Prior Publication Data
US 2015/0186460 A1    Jul. 2, 2015

Related U.S. Application Data

(63) Continuation of application No. PCT/JP2013/063352, filed on May 14, 2013.

(30) Foreign Application Priority Data

Oct. 5, 2012   (JP) ................................ 2012-223667

(51) Int. Cl.
    *G06F 17/30*    (2006.01)
(52) U.S. Cl.
    CPC .. *G06F 17/30424* (2013.01); *G06F 17/30554* (2013.01); *G06F 17/30991* (2013.01)
(58) Field of Classification Search
    CPC ...... G06F 3/0481; G06F 3/011; G06F 3/0304; G06F 3/0321; G06F 3/0485;
    (Continued)

(56) References Cited

U.S. PATENT DOCUMENTS

| | | | |
|---|---|---|---|
| 5,548,702 A * | 8/1996 | Li | ........................ G06F 3/0486 715/769 |
| 2006/0146059 A1* | 7/2006 | Inoue | .................... G06F 3/0481 345/546 |

(Continued)

FOREIGN PATENT DOCUMENTS

| JP | 5-324734 A | 12/1993 |
|---|---|---|
| JP | 2004-302892 A | 10/2004 |
| JP | 2007-133516 A | 5/2007 |

OTHER PUBLICATIONS

Agarawala, A. "Bumptop 1.0—3D Desktop Zen", Bumptop, Apr. 7, 2009, https://www.youtube.com/watch?v=eqcmPJ-oVL0.

(Continued)

*Primary Examiner* — Angelica Ruiz
(74) *Attorney, Agent, or Firm* — Sughrue Mion, PLLC (57) ABSTRACT

There is provided an information processing apparatus including: an information space storage section that stores an information object in connection with an arrangement destination coordinate; an information space screen generation section that generates an information space screen; an update section that receives an instruction given by a user to change the arrangement destination coordinate of the information object or an instruction given by the user to specify a new information object, and that updates information stored in the information space storage section; a retrieval condition receiving section that receives an input of a retrieval condition on a supplemental screen superposed in the information space screen; a retrieval section that performs a retrieval through the information space storage section to find an information object which satisfies the retrieval condition; and a control section that controls the information space screen generation section.

8 Claims, 11 Drawing Sheets

(58) Field of Classification Search
CPC .... G06F 3/0486; G06F 3/0488; G06F 17/212;
G06F 2203/04806; G06F 3/04815
See application file for complete search history.

(56) References Cited

U.S. PATENT DOCUMENTS

| | | | | |
|---|---|---|---|---|
| 2008/0148189 | A1* | 6/2008 | Szent-Miklosy | G06F 3/0481 715/848 |
| 2008/0191864 | A1* | 8/2008 | Wolfson | G06F 3/011 340/524 |
| 2009/0086042 | A1* | 4/2009 | Vartiainen | G06F 1/1626 348/211.4 |
| 2010/0229113 | A1* | 9/2010 | Conner | G06Q 10/10 715/771 |
| 2010/0333017 | A1* | 12/2010 | Ortiz | G06F 3/0483 715/800 |
| 2011/0093778 | A1* | 4/2011 | Kim | G06F 3/041 715/702 |
| 2011/0157169 | A1* | 6/2011 | Bennett | G06F 3/14 345/419 |
| 2012/0235921 | A1* | 9/2012 | Laubach | G06F 3/0238 345/172 |
| 2012/0290950 | A1* | 11/2012 | Rapaport | H04L 51/32 715/753 |

OTHER PUBLICATIONS

Communication dated Feb. 22, 2016, issued by the Australian Patent Office in counterpart Australian Patent Application No. 2013325961.
Search Report dated Jun. 18, 2013 issued in International Application No. PCT/JP2013/063352 (PCT/ISA/210).
Written Opinion dated Jun. 18, 2013 issued in International Application No. PCT/JP2013/063352 (PCT/ISA/237).
Notification of Reason for Refusal dated Nov. 24, 2015, issued by the Japanese Patent Office in counterpart Japanese Application No. 2012-223667.
Building Cyber Desktop by Making Desktop Three Dimensional "BumpTop", [online], May 13, 2009, the Internet, <URL,http://www.oshiete-kun.net/archives/2009/05/3dbumptop.html> [Accessed Jun. 5, 2013] ( 5 pages total).

* cited by examiner

| CANVAS ID (INFORMATION SPACE ID) | ACCESS RIGHTS INFORMATION | OBJECT ID | COORDINATES INFORMATION |
|---|---|---|---|
| C001 | USER A, USER B, USER C, ⋮ | 01234 | (100,100) |
| | | 01235 | (1192,645) |
| | | 01236 | (103,135) |
| | | ⋮ | ⋮ |
| C002 | USER B, USER E, USER F, ⋮ | 02345 | (1100,1200) |
| | | 02346 | (120,150) |
| | | 02347 | (130,103) |
| | | ⋮ | ⋮ |

INFORMATION PROCESSING APPARATUS AND NON-TRANSITORY COMPUTER READABLE MEDIUM FOR DISPLAYING AN INFORMATION OBJECT

CROSS-REFERENCE TO RELATED APPLICATION(S)

This is a continuation of International Application No. PCT/JP2013/063352 filed on May 14, 2013 and claims priority from Japanese Patent Application No. 2012-223667 filed on Oct. 5, 2012.

TECHNICAL FIELD

The present invention relates to an information processing apparatus and a program.

SUMMARY

According to an aspect of the exemplary embodiments of the present invention, there is provided an information processing apparatus including: an information space storage section that stores information objects in connection with arrangement destination coordinates at which the information objects are to be positioned in an information space; an information space screen generation section that generates an information space screen which displays a state in which each information object stored in the information space storage section is positioned at corresponding arrangement destination coordinates; an update section that receives, on the information space screen being displayed, an instruction given by a user to change the arrangement destination coordinates of the information object displayed on the information space screen or an instruction given by the user to specify a new information object to be arranged in the information space and arrangement destination coordinates of the new information object, the update section being configured to update information stored in the information space storage section correspondingly to the received changing instruction or the received specifying instruction; a retrieval condition receiving section that receives an input of a retrieval condition; a retrieval section that performs a retrieval through the information space storage section to find an information object which satisfies the retrieval condition; and a control section that controls the information space screen generation section such that, when at least one information object that satisfies the retrieval condition is found as a result of the retrieval, the information space screen generation section generates the information space screen in which the information object found through the retrieval are displayed in a display form discriminable from objects that do not satisfy the retrieval condition, with the entire information space used as a display area.

BRIEF DESCRIPTION OF THE DRAWINGS

Exemplary embodiments of the present invention will be described in detail based on the following figures, wherein.

DETAILED DESCRIPTION

In cases where when something is studied in a group, for example, the issue is often discussed while lots of materials are affixed to a wall or a whiteboard. Presumably, in such cases, strongly correlated materials are often put affixed to each other.

A system which virtually implements on a computer such a way of real sharing of information has been proposed as well. In such a system, a plurality of users access a common information space, refer to a group of information objects (e.g., files of electronic documents, audio data, image data, multimedia data, etc.) arranged in the information space, additionally edit the information objects or arrange a new information object in the information space, so that collaborative work goes ahead among those plural users. The information space is a virtual space of a definite size having not less than one-dimensional coordinates (e.g., two-dimensional plane). An information object is arranged at a position of coordinates designated in the information space by the user. In general, correlative information objects are closely located in the information space.

Further, on a personal basis, there is a system which enables a user to put a file onto a favorite position on a desktop screen or on a folder displaying screen.

According to these systems, a position where an individual information object is arranged in the information space reflects an intention of the user who has arranged that object.

An ordinary retrieval for lots of information objects (simply referred to as "objects", hereafter) arranged in such an information space generally produces a list of objects of retrieval results on display, similarly to a retrieval of usual file systems or of a database.

The embodiment, in contrast, provides a retrieval result in such a manner that the positions where objects of found as the retrieval result are arranged in the information space are recognizable.

Figure 1:
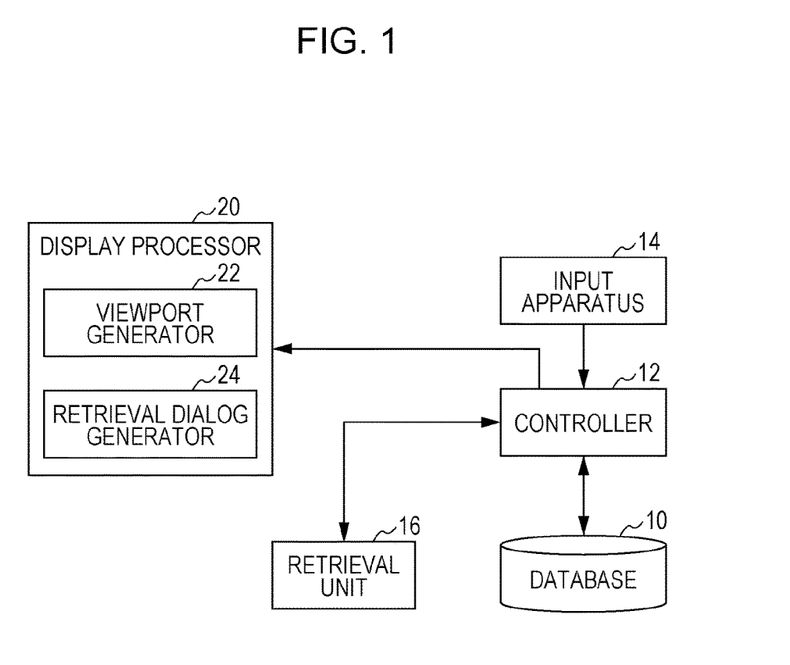
FIG. 1 illustrates an example of an information processing apparatus of an embodiment.

FIG. 1 illustrates an exemplary functional configuration of an information retrieval apparatus of the embodiment. The information retrieval apparatus has a database 10, a controller 12, an input device 14, a retrieval unit 16, and a display processor 20.

The database 10 is a database that stores information on an information space in which a group of information objects is arranged.

Figure 2:
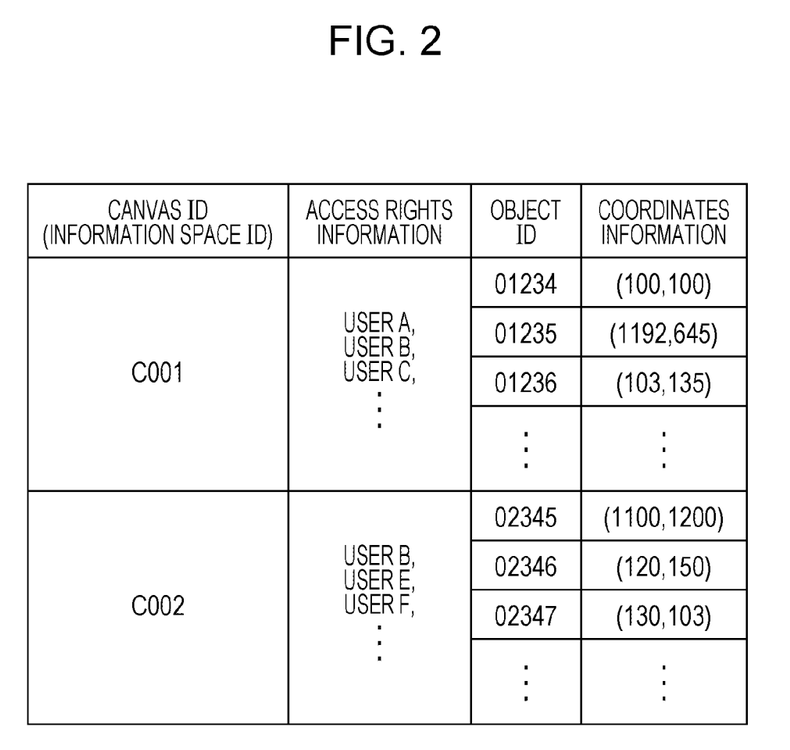
FIG. 2 illustrates an example of contents of data registered in a database.

FIG. 2 illustrates an example of data registered in the database 10. Information concerning two information spaces is registered in the database 10 of this example. The example supposes that each information space is a two-dimensional rectangular plane of a definite size. The plane is referred to as a "canvas" hereafter. The canvases (information spaces) are each assigned unique identity information called a canvas ID.

Information on objects, the number of which is not less than zero, arranged on each of the canvases is registered in connection with the canvas ID of the relevant canvas. In the example shown in FIG. 2, information on an individual object includes an object ID and coordinates information. The object ID is the identity information of the relevant object. The entity of each object is reserved in the database 10 in connection with the object ID. The coordinates information is information which indicates coordinates of a position where the relevant object is arranged on the canvas (a rectangular plane of a definite size, according to the example). According to the example, further, a list of users each having a right to access the canvas is registered as "access right information" in connection with the canvas ID. The information retrieval apparatus, upon a request to login the canvas being made, allows the login if the request is from a user registered in the corresponding access right information list so as to enable the user to access the canvas.

The information on two information spaces is registered in the database 10 in FIG. 2, which is just one example, though. The number of information spaces registered in the database 10 may be one, three or greater.

Figure 3:
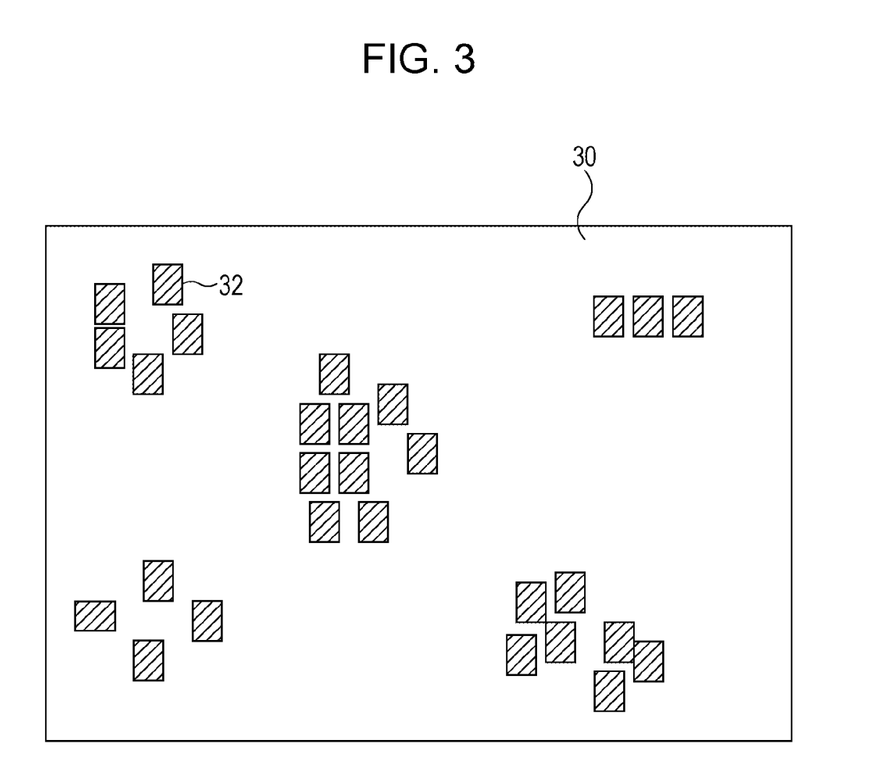
FIG. 3 illustrates an exemplary two-dimensional canvas (information space)

FIG. 3 illustrates an example of the canvas 30. The canvas 30 is a rectangular plane of a definite size. For instance, a coordinate system is specified having the origin of coordinates at the left-top vertex of the canvas 30, the x-axis extended rightwards from the origin and the y-axis extended downwards from the same. A lot of objects 32 are arranged on the canvas 30. The objects are each expressed in the Figure as a rectangle with hatching, just for convenience' sake.

The controller 12 is a system which controls the entire information retrieval apparatus, and performs control of information exchange between the database 10 described above and the aforementioned components such as the input device 14, the retrieval unit 16 and the display processor 20 which are described below.

The input device 14 is a device which receives a user's input operation to the information retrieval apparatus. For instance, a keyboard, a mouse, a touch-panel or the like is an example of the input device.

The display processor 20 carries out a process to generate a display screen for UI (user interface) of the information retrieval apparatus. The display processor 20 has a viewport generator 22 and a retrieval dialog generator 24.

The viewport generator 22 generates a "viewport" screen and displays it on a display apparatus which is omitted from the drawings. The viewport is a screen which partially or entirely displays a canvas that a user has logged in. For instance, a viewport 40 exemplarily illustrated in FIG. 4 displays a group of objects within a display area 35 in the canvas 30. The display area can be changed in size by means of, for example, an operation to change magnification ratio, etc.

Figure 4:
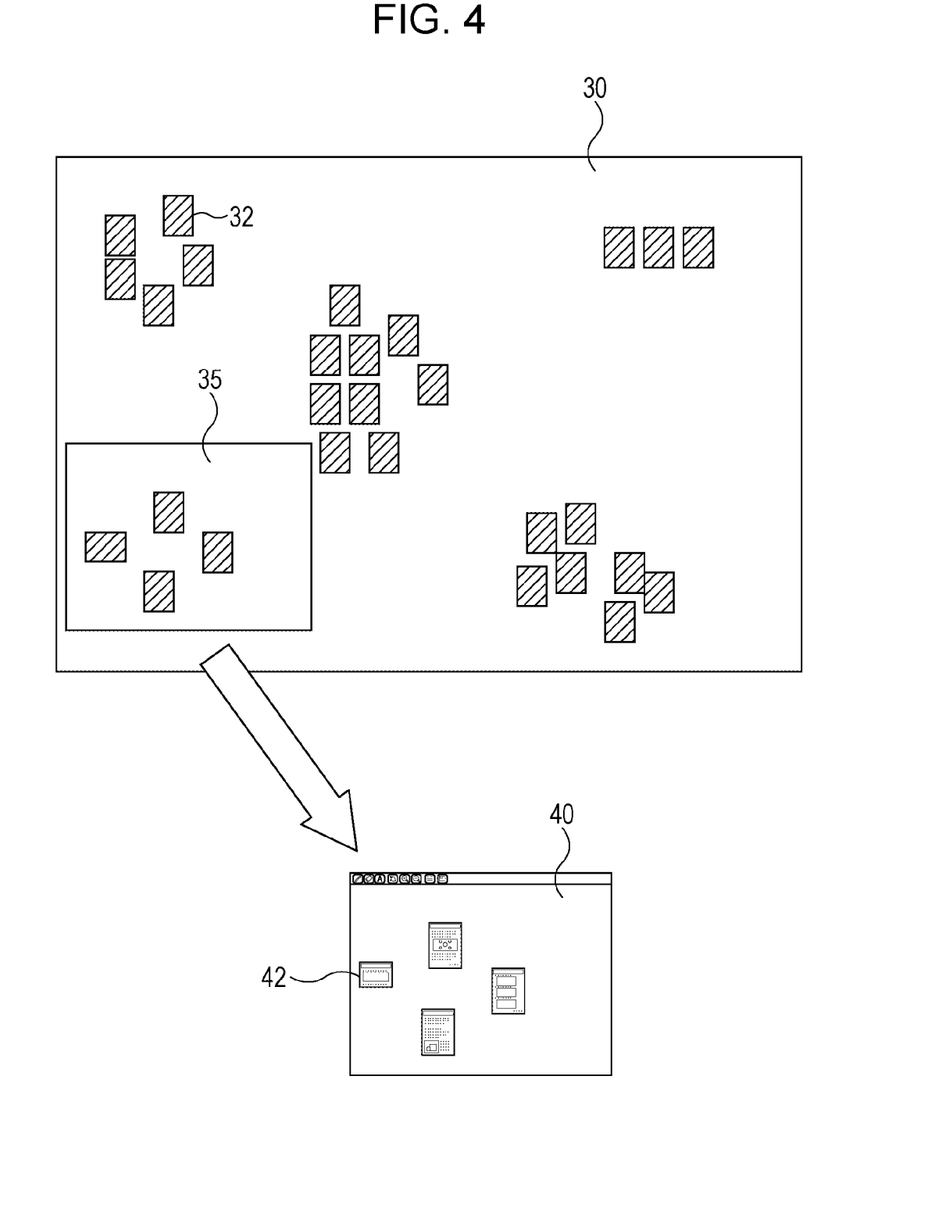
FIG. 4 illustrates an example of a viewport (display window) in which a portion of the canvas is displayed.

As shown in FIG. 4, by way of example, the viewport 40 displays icons 42 each of which indicates individual one of the objects 32 in the display area 35. For instance, as the icon of the object 32, a thumbnail of the object (e.g., a thumbnail of a representative page in case of an electronic document, or a thumbnail of a typical scene in case of a video file) can be used. The positions of the respective icons 42 in the viewport 40 correspond to the coordinates of the relevant objects 32 in the display area 35 of the canvas 30.

If a user carries out an operation to choose one of the objects (icons 42) on the viewport 40 and open it by means of the input device 14 such as a mouse, an application connected with that object is started by the controller 12. The application opens an entity file of the object, and a window which indicates contents of the entity file is displayed on the screen of the display apparatus.

The user having logged in the canvas 30 can move the area displayed in the viewport 40 by a scrolling operation, or can expand or reduce the area displayed in the viewport 40 by changing the display magnification. Further, the user may move the icon 42 displayed in the viewport 40 by a drag-and-drop operation, etc., or relocate a file from the outside of the database 10 into the viewport 40, so that the object 32 of the file an be registered in the database 10. When the object 32 is moved, the controller 12 updates the coordinates of the object 32 in the database 10 to the coordinates of the destination. Further, if a new object 32 is arranged in the viewport 40, the controller 12 registers the object ID and the coordinates of the position of the object 32 in the database 10 in connection with the canvas ID of the relevant canvas 30. Further, if an object 32 that has already been registered in the database 10 is deleted, the relevant object is deleted from the viewport 40 and the database 10. Deletion instructions can be given by, for example, operations such as pressing the right button of a two-button mouse so as to display a pull-down menu and selecting deletion on the menu, or holding down the object itself on a touch-panel so as to display a pull-down menu and to select deletion on the menu, etc.

The system may be used in such a manner that more than one users log in one and the same canvas 30 to have a discussion on a specific object 32 on the canvas 30 by using a real-time communication system, or to move the position of the object 32 in accordance with the progress of the discussion.

Referring back to FIG. 1, the retrieval dialog generator of the display processor 20 generates a screen for conversation (dialog) which receives a user's input of a retrieval query addressed to the group of the objects 32 arranged in the canvas 30. When a user inputs a retrieval request, the retrieval dialog generator 24 generates a retrieval dialog and displays the dialog on the display apparatus.

Figure 5:
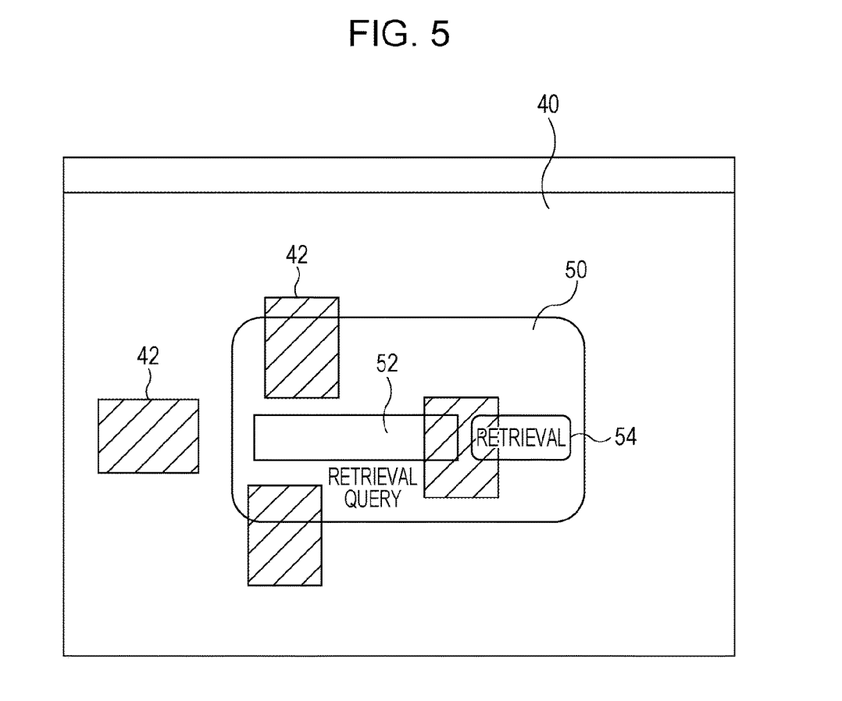
FIG. 5 illustrates an example of a viewport which displays a retrieval dialog box.

FIG. 5 illustrates an example of the viewport 40 overlain by a retrieval dialog 50. The retrieval dialog 50 of this example is displayed translucently, so that the canvas 30 and the icons 42 underlying the retrieval dialog 50 can be seen therethrough.

Further, the retrieval dialog 50 of this example includes an input blank space 52 to be filled in with a retrieval query, and a command button 54 for instructions to carry out a retrieval process according to the inputted query. The retrieval query is information which represents conditions that the object 32 to be retrieved should satisfy. If a character string is inputted as a retrieval query and the command button 54 is pressed, an object 32 including the character string is searched for by the retrieval unit 16.

The retrieval unit 16 searches, from among the objects 32 included in the canvas 30 currently logged in by the user, an object 32 which satisfies the retrieval query inputted from the retrieval dialog. The retrieval may be carried out only for a content portion in the entity file of the object 32, only for attributes of the object (the creator, update date and time, file type, one or more keywords given by the user, etc.), or for both the content and the attributes. For instance, in a case where only a content portion is retrieved, an object 32 having a content portion (e.g., the text of an electronic document) containing the retrieval query (e.g., a character string) is searched out. The attributes of the object to be retrieved may be those included in the entity file of the object 32, or may be those managed in the database separately from the entity file of the object.

For instance, when objects 32 on the canvas 30 are electronic documents, the retrieval unit 16 may calculate a TF (Term Frequency) of each of the objects 32 based on the character string inputted as the retrieval query so as to form the retrieval result by extracting the objects 32 in order of higher TF. In such a case, TF can be calculated, for example, according to the following equation.

$$tf_{i,j} = \frac{n_{i,j}}{\sum_k n_{k,j}}$$

The term $n_{i,j}$ appearing here is the number of times of appearances of a character string i in a document j, and the term $tf_{i,j}$ is the TF of the document j for the character string i.

An object exhibiting a higher TF has a higher degree of matching with the retrieval query, and is positioned at an upper rank in the retrieval results. Incidentally, if there are plural objects of an equal TF, they may be ranked in higher order of the number of times of appearances of the retrieval query character string in the object (the number of hits).

The retrieval unit 16 delivers the retrieval results obtained in response to the given retrieval query back to the controller 12. The controller 12 displays the retrieval results on the display apparatus via the display processor 20.

In the described embodiment, the retrieval results are displayed in such a manner that the positions on the canvas 30 where the objects 32 searched out through the retrieval are positioned can easily be recognized. More specifically, the controller 12 controls the viewport generator 22 such that the entire area of the canvas 30 is displayed in the viewport 40, and such that the icons of the objects as the retrieval results are displayed in a form different from that for the icons of objects other than those of the retrieval results.

Figure 6:
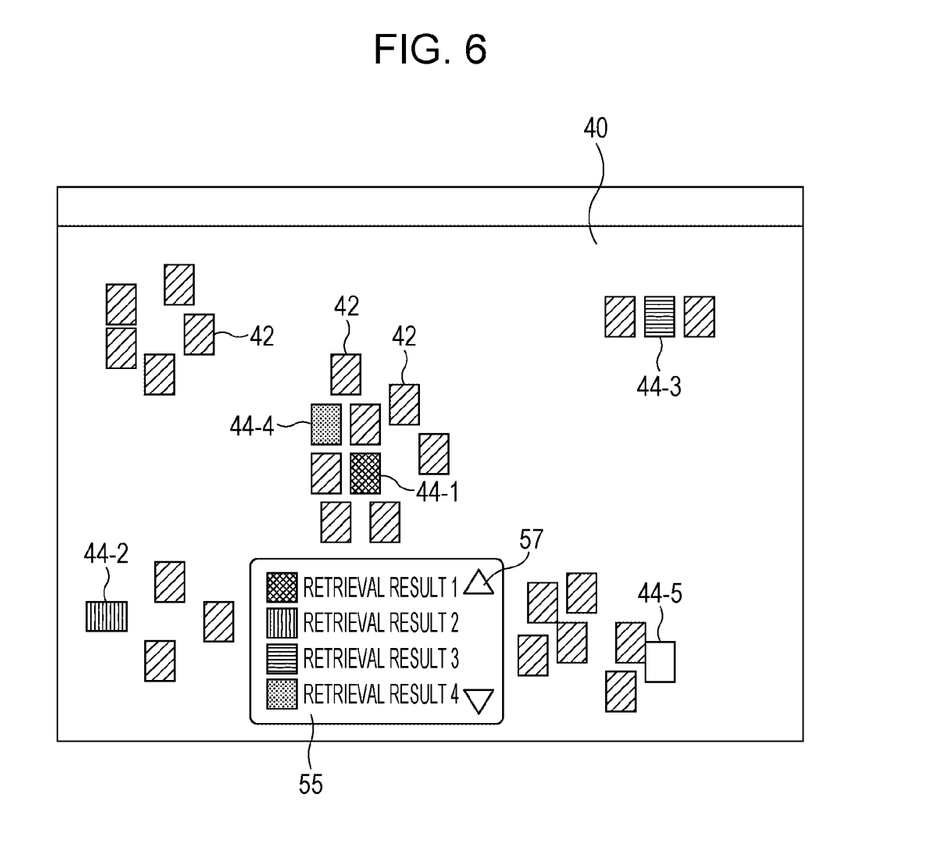
FIG. 6 illustrates an example of a viewport which displays retrieval results, in a case where there are plural retrieval results.

FIG. 6 illustrates an example of the viewport 40 in which retrieval results are displayed. The entirety of the canvas 30 exemplarily illustrated in FIG. 3 is displayed in this viewport 40. Icons 44-1 through 44-5 of five retrieval result objects are displayed in the viewport 40 in a form differing from a regular display form of icons (e.g., color added, a mark indicating a retrieval result added, etc.). Meanwhile, icons 42 not being retrieval results are displayed in the regular display form. Further, the retrieval result icons 44-1 through 44-5 (collectively referred to as icons 44, hereafter) of this example are each displayed in order of degree of match with the retrieval query in a peculiar display form corresponding to its rank of matching (e.g., peculiar color added, a mark indicating the ranking added, etc.). When the user carries out an operation on one of these retrieval result icons 44 to open the file by using a mouse, for example, an application is started to open the entity file of the object which corresponds to this icon 44. A function may be added to enable free adjustment of the size of the canvas 30 when the area of the entire canvas 30 differs from the area of the viewport 40. For instance, when a mouse has a wheel, the canvas 30 can be expanded or reduced by a rotation of the wheel. When a touch panel is used, the canvas 30 can be expanded or reduced by an operation on a touch-panel to increase or decrease the distance between two fingers on the object displayed on the touch panel.

Further in the example shown in FIG. 6, a retrieval result window 55 is displayed to overlie the viewport 40. The retrieval result window 55 can be made translucent so that the underlying viewport 40 can be seen therethrough. The retrieval result window 55 displays in the form of a list information on the respective retrieval result objects (e.g., file names, or a text in the file around a portion hit by the retrieval). If the retrieval result window 55 is unable to display all of the retrieval results at one time, the region of the retrieval results displayed in the retrieval result window 55 can be moved by operating a scroll button 57. Individual retrieval results enumerated on the list are each displayed in a display form which corresponds to the display form of the object icon 44 of the relevant retrieval result on the viewport 40 (e.g., same color added, same mark added, etc.). The respective retrieval results enumerated on the list are each linked to a corresponding object 32. When the user carries out an operation to open one of the retrieval results enumerated on the list, an application connected with the object indicated by the retrieval result is started to open the entity file of that object.

Figure 7:
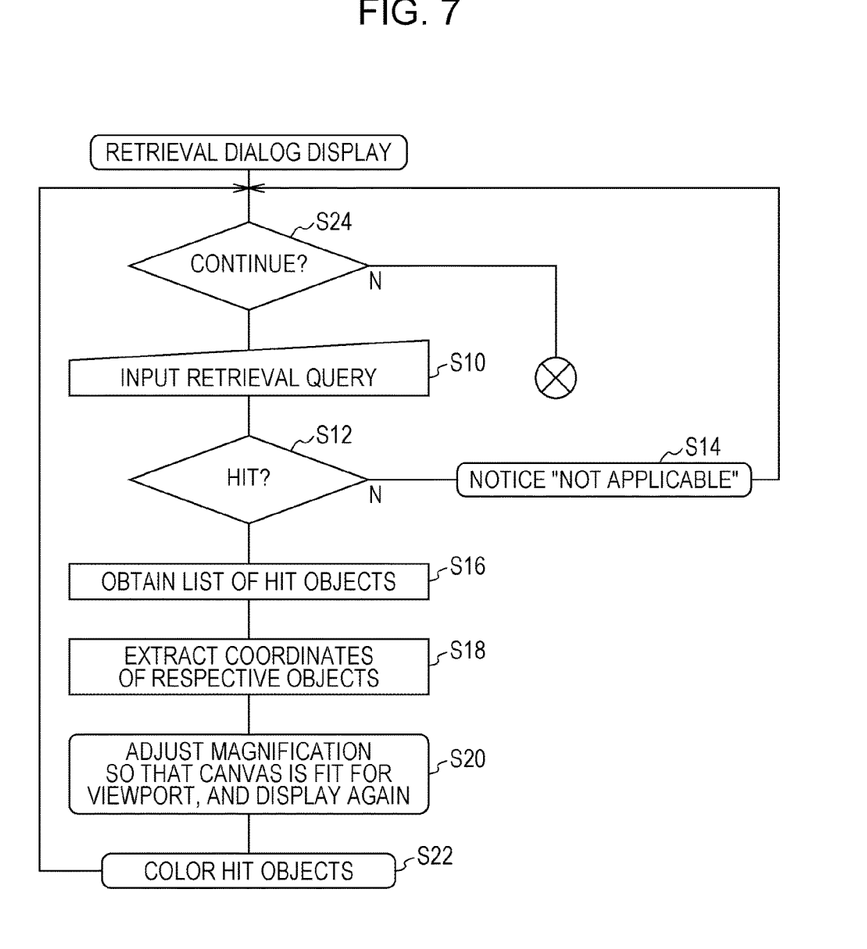
FIG. 7 illustrates an example of data processing procedure performed by a retrieval unit.

FIG. 7 illustrates an example of the processing procedure performed by the information retrieval apparatus. According to the procedure, when a user having logged in the canvas 30 carries out an operation to call the retrieval dialog 50, the retrieval dialog 50 is displayed on the viewport 40, and the user inputs a retrieval query to the retrieval dialog 50 so as to give instructions to carry out a retrieving operation (S10). The retrieval unit 16 performs a retrieval through the database 10 to find an object 32 which satisfies the retrieval query ("hit" object) in response to the instructions. The controller 12 determines whether the retrieval performed by the retrieval unit 16 has exhibited any hit (S12). If not (the determination result is N), the controller 12 performs a control to make the display processor 20 generate and display a retrieval result window 55 displaying a massage saying "no hit" (no object satisfies the retrieval query) (S14). In contrast, if there is any hit, the controller 12 obtains a list of hit objects from the retrieval unit 16 (S16), provides the display processor 20 with that list and gives instructions to display the retrieval results. The viewport generator 22 in the display processor 20 obtains information about coordinates of the respective objects in the list from the database 10 according to the instructions (S18). Then, the viewport generator 22 adjusts the display magnification so that the entire canvas 30 just fits for the display size of the viewport 40 (S20). The viewport generator displays icons 42 which correspond to the respective relevant retrieval result objects on the viewport 40 displaying the entire canvas 30 with separate colors in order of degree of matching with the retrieval query (S22). Then, whether the retrieval work is to be continued or not is determined (S24). The determination is made such that the retrieval work should be ceased when an operation to close the retrieval dialog 50 is carried out, otherwise the retrieval work should continue. The process ends when the determination is made to cease the retrieval work. The process ends when determination is made to cease the retrieval work.

According to the embodiment described above, if any object 32 as being hit, the entirety of the canvas 30 is displayed on the viewport 40, and the hit objects 32 are displayed on the entire area of the canvas 30 in a manner to be discriminable from other objects that are not hit. The positions where the objects are arranged are meaningful for the user. In other words, the user has an image about what types of object 32 are arranged at which part of the canvas 30. The user therefore can presume to a certain degree of credibility the natures of the hit objects based on the positions of these hit objects on the entire canvas 30 displayed in the viewport 40, without opening such hit objects, on the ground of the image of his or her own.

Further, when the retrieval query hits on plural objects 32, information on the positions of the respective retrieval result objects 32 on the viewport 40 helps the user in narrowing down candidate objects 32 which having higher probability of matching with the user's intention of the retrieval. Further, information on the rank in the degree of matching with the, retrieval query, when taken into consideration, facilitates an approach toward an object 32 which matches with the intention of the retrieval.

Figure 8:
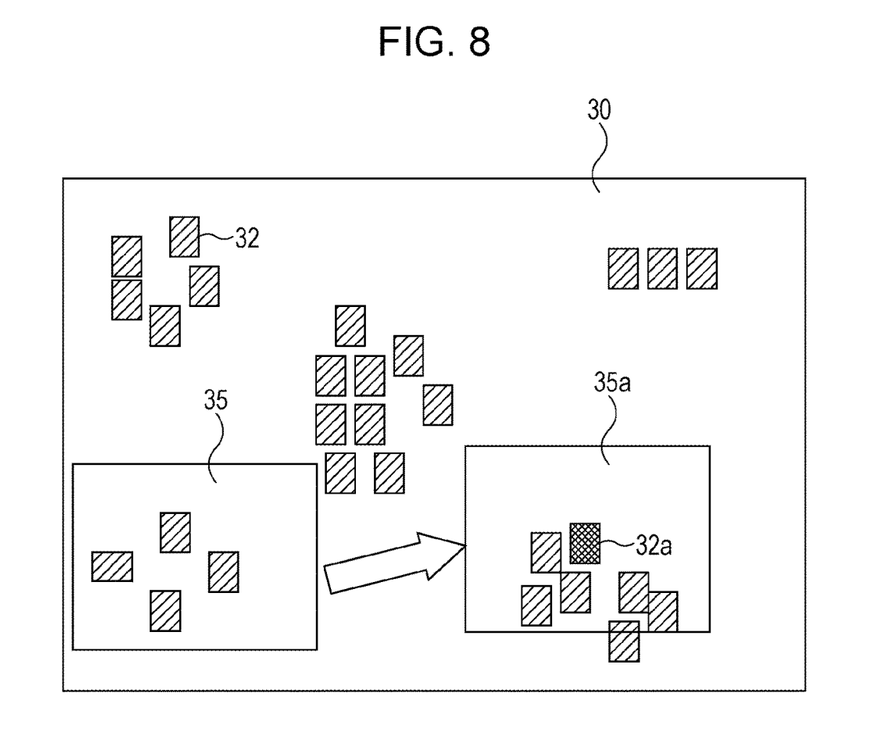
FIG. 8 explains an exemplary viewport which displays a retrieval result when there is one single retrieval result.

Although in the described embodiment the display of the retrieval results is performed such that entirety of the canvas 30 appears in the viewport 40, the arrangement may be such that the display in this manner is performed only in a limited case where there are plural retrieval result objects 32. When there is only one single retrieval result object 32, it is generally desirable that the access to this object be made without delay. The arrangement, therefore, may be such that, when there is only one retrieval result object 32, the viewport generator 22 moves the display area so that a region centered at the single retrieval result object 32 is displayed. Thus, the viewport generator 22 can move the display area of the viewport 40 so as to display an area centered on the retrieval result object 32. For example, as illustrated in FIG. 8, the area display on the viewport 40 is translationally moved from a region 35 before the execution of the retrieval operation to a region 35a centered on the one single retrieval result object 32a, so that the retrieved result object appears at the center of the viewport 40.

A description will now be given of a modification of the described embodiment having an additional function termed as "neighborhood retrieval". The neighborhood retrieval is one form of data processing in which not only object that exhibits best match with the retrieval query but also other objects positioned in the vicinity of this object are determined as the retrieval result objects.

Figure 9:
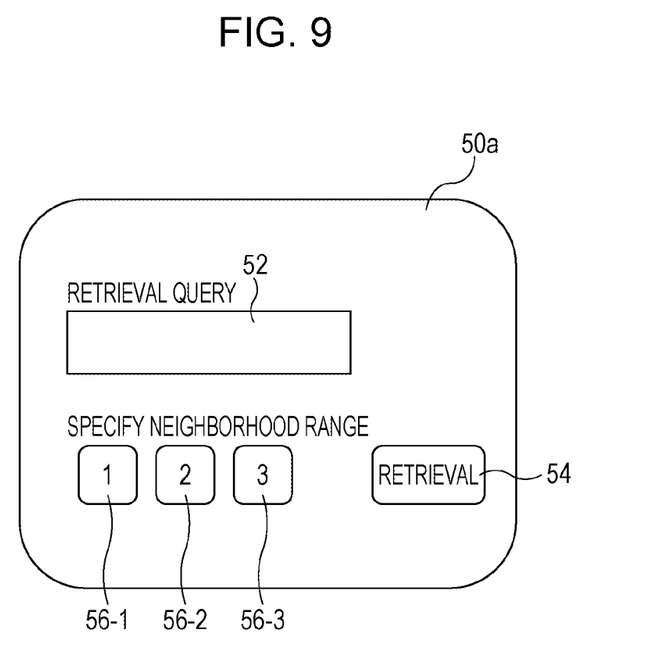
FIG. 9 illustrates an exemplary retrieval dialog box in a case where a neighborhood retrieval is to be carried out.

The retrieval dialog generator 24 of this modification generates, as exemplarily illustrated in FIG. 9, a retrieval dialog 50a having neighborhood range specifying buttons 56-1, 56-2 and 56-3 (collectively referred to as "neighborhood range specifying buttons 56", hereafter) in addition to the input space 52 for a retrieval query. The neighborhood range specifying buttons 56 are buttons for specifying a "neighborhood" range with respect to an object which satisfies the retrieval query. In this modification, the "neighborhood" with respect to an object which satisfies the retrieval query is defined as a circle having a predetermined radius and centered at the coordinates of the position where the object is located and the area inside the circle. Further, three levels "1", "2", and "3" are set for the range of the "neighborhood". A greater level number indicates a greater distance (radius) which specifies the "neighborhood". The value of the distance (radius) of the "neighborhood" is set beforehand for each of the levels.

The user inputs a character string representing a retrieval query into the input space 52, presses one of the neighborhood range specifying buttons 56 which indicates a desired "neighborhood" level to put it into a selected state, and presses the command button 54 for giving instructions to execute a retrieving operation.

In accordance with the instructions, The retrieval unit 16 first performs the retrieval throughout the canvas 30 to retrieval out an object 32 which would satisfy the retrieval query. The object 32 which is found to satisfy the retrieval query through the retrieval is nominated as one of retrieval results and, at the same time, serves as a reference for the "neighborhood" in the neighborhood retrieval. Then, an object or objects 32, which are positioned within the distance (radius) selected by the neighborhood range specifying button 56, are obtained and determined as being the results of the neighborhood retrieval. The results thus determined are output together with the retrieval result which satisfies the retrieval query.

Figure 10:
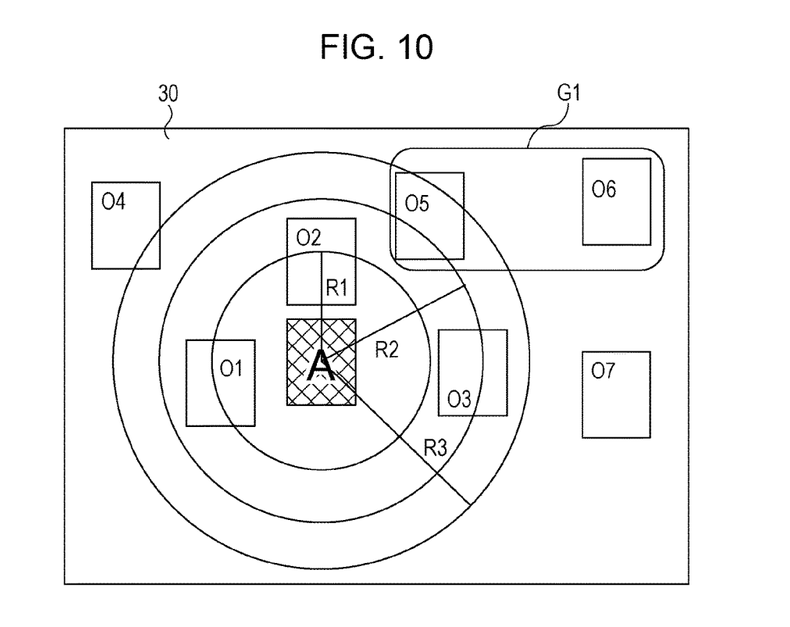
FIG. 10 explains the neighborhood retrieval.

For instance, In FIG. 10, a rectangular icon carrying a symbol "A" on the canvas 30 is the object 32 hit by the retrieval query. Concentric circles centered on the central point of the icon having radii of R1, R2 and R3 indicate neighborhood ranges which correspond to the numerals 1, 2 and 3 representing the neighborhood levels, respectively. If the neighborhood range specifying button 56-1 of the numeral "1" has been selected, the objects designated by numbers "01" and "02" are obtained as the neighborhood retrieval results. Similarly, if the neighborhood range specifying button 56-2 of the numeral "2" has been selected, the objects carrying numbers "01", "02" and "03" are obtained as the neighborhood retrieval results. If the neighborhood range specifying button 56-3 of the numeral "3" has been selected, the objects denoted by numbers "01", "02", "03" and "05" are obtained as the neighborhood retrieval results. In this example, the central point of each icon is determined as being the position coordinates of the relevant object, and whether the object belongs to the "neighborhood" or not is determined depending upon whether the central point, i.e., the position coordinates, is within the range of the "neighborhood". This, however, is just an example. For instance, an object may be determined as being within the neighborhood, when at least a portion of the relevant icon belongs to the specified range of neighborhood. Conversely, an object may be determined as belonging to the scope of neighborhood only when entirety of the relevant icon falls within the specified range of neighborhood.

The controller 12 delivers to the display processor 20 the results of the retrieval performed by the retrieval unit 16, i.e., a list of objects which each satisfies the retrieval query, together with a list of objects positioned in the neighborhoods of each of the objects included in the former list (neighborhood retrieval results). Upon receipt of these lists, the display processor 20 causes the respective retrieval result icons to be displayed on the viewport 40 showing the entirety of the canvas 30, in a form which enables discrimination between the retrieval result icons and other icons. The display may be made such that icons which satisfy the retrieval query and icons as the results of the neighborhood retrieval are discriminable from each other. For instance, the icons corresponding to objects that satisfy the retrieval query are colored with a warm color (hues, brightness, etc., may be made peculiar according to the retrieval rank), while icons of neighborhood retrieval result objects bear a cold color.

Further, objects may be grouped such that, if one of the objects of the same group belongs to the "neighborhood range", other objects of the same group not belonging to the neighborhood range are also included in the neighborhood retrieval results. More specifically, according to this example, information on groups each including plural objects is registered in the database 10. For instance, information indicating the group to which each object belongs is managed in the database 10. Obviously, such an object may exist that does not belong to any group. Then, if an object positioned in the neighborhood of an object which satisfies the retrieval query belongs to one of the groups, the retrieval unit 16 operates such that other objects which belong to the relevant group are included in the neighborhood retrieval results. In the example shown in FIG. 10, objects "05" and "06" belong to the same group "G1". If, in this case, it is determined that the object "05" of the group "G1" falls in the neighborhood of an object "A" which satisfies the retrieval query, the object "06" which belongs to the same group "G1" is determined to fall in the same neighborhood.

Further, an exemplary case where the database 10 has an object version management function will be explained as another modification. In this modification, when an object has a plurality of versions, the data of the respective versions is stored in the database 10. The viewport generator 22 displays the object having plural versions with an icon 42 in a display form indicating to what extent the version has reached.

Figure 11:
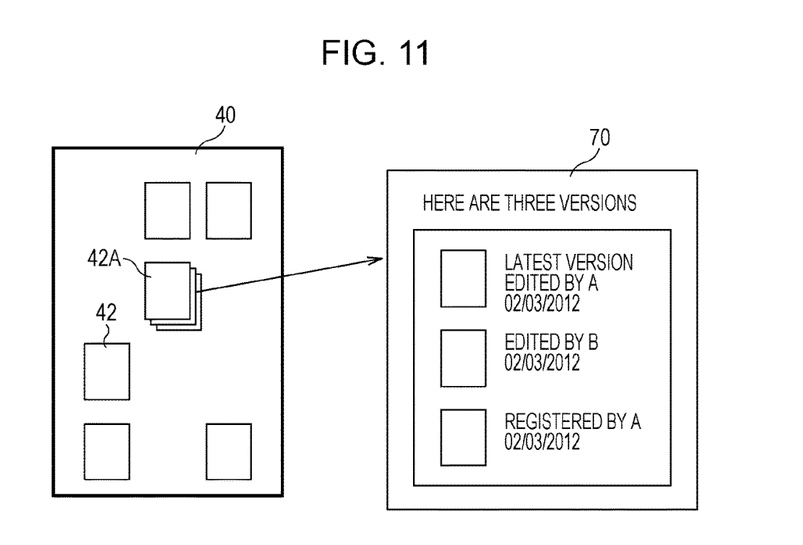
FIG. 11 illustrates an exemplary viewport in which versions are on display.

For instance, use an icon which represents a state in which sheets as many as the number of the versions are put on top of one another. FIG. 11 illustrates an example. According to this example, an object having three versions is expressed on the viewport 40 by an icon 42A which represents a state in which three sheets are superposed one on another. Meanwhile, another object having one single version is expressed with an icon 42 which represents a single sheet. Further, if the user carries out a specific operation for the icon 42A (e.g., put the cursor on top of the icon 42A, etc.), the viewport generator 22 displays a version information 70 concerning the object corresponding to the icon 42A.

Figure 12:
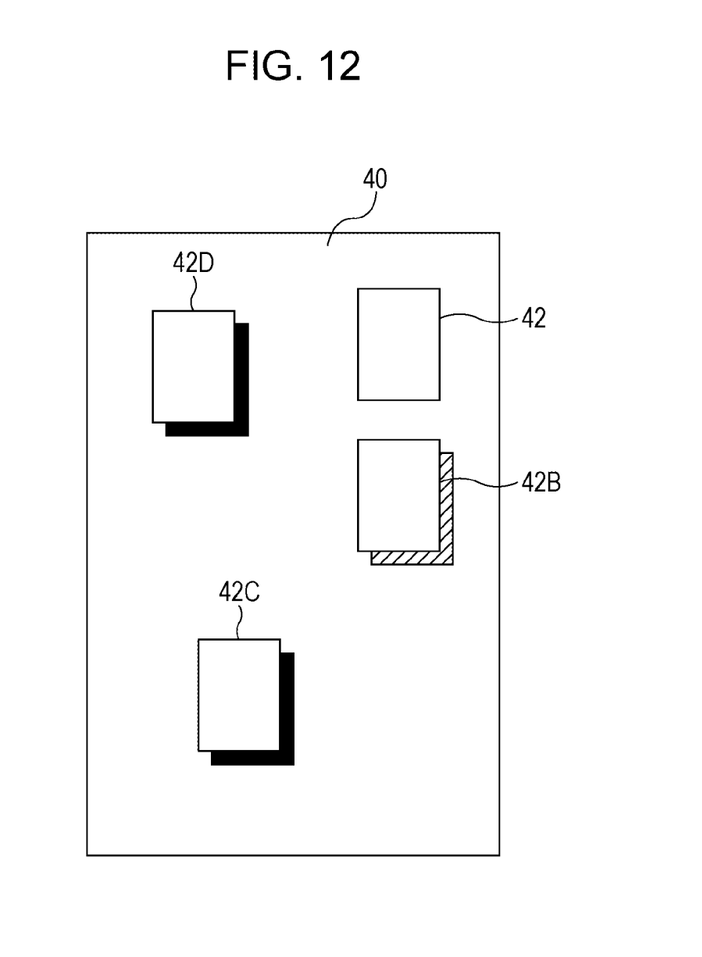
FIG. 12 illustrates another exemplary viewport in which versions are on display.

Further, in an example shown in FIG. 12, icons 42B, 42C and 42D of objects having plural versions are each shown with a shadow represented by hatching or paint, and the thickness of the shadow is increased as the number of versions increases.

Such icon indications reflecting the number of versions may be carried out on the viewport 40 which displays the retrieval results.

The more important a document is, the more times it is revised, tending to increase the number of versions. This modification reflects the number of versions in each of the icons on the viewport 40 so as to provide the user with material for enabling the user to evaluate the degree of importance of the object corresponding to each of the icons.

The information retrieval apparatus described in the foregoing may be implemented by means of making a general-purpose computer run programs which represent data processing of the respective functional modules described above. For instance, the computer mentioned here has a hardware circuit configuration in which components such as a microprocessor such as a CPU, a memory (primary storage) such as a random access memory (RAM) and a read only memory (ROM), an HDD controller which controls an HDD (hard disk drive), various kinds of I/O (input and output) interfaces, a network interface for connection with a local area network are connected, e.g., via a bus. For instance, a disk drive for reading from and/or writing into removable disk recording media such as CDs or DVDs, a memory reader writer for reading from and/or writing into removable non-volatile recording media of various standards, e.g., flash memories or the like, may be connected with the bus through, for example, via an I/O interface. Programs describing the contents of processing performed by the respective functional modules described above are stored in a fixed storage device such as a hard disk drive, via a recording media such as a CD or a DVD or via communication means such as networks, and are installed into the computer. The programs stored in the fixed storage device are read onto the RAM and run by the microprocessor such as the CPU, whereby the group of functional modules exemplarily described above are implemented. Further, one or more of functional modules which form a print server may be configured to be a hardware circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an information space memory configured to store one or more information objects in connection with an arrangement destination coordinate at which the information object is positioned in an information space; and
    at least one hardware processor configured to execute:
        an information space screen generation section configured to generate an information space screen which displays a state in which each of the one or more information objects stored in the information space memory is positioned at a corresponding arrangement destination coordinate;
        an update section configured to receive, on the information space screen being displayed, an instruction given by a user to change the arrangement destination coordinate of the one or more information objects displayed on the information space screen or an instruction given by the user to specify a new information object and an arrangement destination coordinate of the new information object in the information space, and that updates information stored in the information space memory correspondingly to a received changing instruction or a received specifying instruction;
        a retrieval condition receiving section configured to display a supplemental screen superposed in the information space screen having an input field to receive an input of a retrieval condition from a user, the retrieval condition including a search query character string;
        a retrieval section configured to retrieve a first information object, among the one or more information objects, which matches the search query character string; and
        a control section configured to control, in response to the search query character string, the information space screen generation section to generate the information space screen in which the first information object is displayed in a display form different from all other information objects, among the one or more objects, that were not received by the retrieval section.

2. The information processing apparatus according to claim 1, wherein
    the retrieval condition receiving section is further configured to receive, as the retrieval condition, a reference condition that specifies a third information object as a reference and a distance condition representing a distance which defines a neighborhood of the third information object satisfying the reference condition, and the retrieval section is further configured to retrieve the third information object satisfying the reference condition, and to find a neighborhood object which is a fourth information object arranged within the distance represented by the distance condition from the third information object, and the third information object satisfying the reference condition and the neighborhood object are output by the retrieval section as the objects satisfying the retrieval condition.

3. The information processing apparatus according to claim 2, wherein the information space memory is further configured to store information of a group constituted by two or more information objects, and the retrieval section is further configured to output, as one of the objects satisfying the retrieval condition, an information object belonging to the same group as the neighborhood object found.

4. The information processing apparatus according to claim 1, wherein the information space memory is further configured to store, for at least one of the information objects, data of a plurality of versions of the information object, and the information space screen generation section is further configured to generate, as the information space screen, a screen which displays an individual information object in a display form that enables the user to distinguish the number of the versions of the information object.

5. The information processing apparatus according to claim 1, wherein the information space memory is further configured to store the one or more information objects correspondingly to the arrangement destination coordinate in each of a plurality of information spaces in which a plurality of access right information corresponding to a plurality of identity information different from each other is individually registered.

6. The information processing apparatus according to claim 1, wherein the information space memory is further configured to store the one or more information object correspondingly to the arrangement destination coordinate in and information space in which an access right information corresponding to a plurality of users is registered.

7. The information processing apparatus according to claim 1, wherein the control section is further configured to control the information space screen generation section to parallel shift the supplemental screen in order for the information object retrieved to be positioned at a middle of the supplemental screen when the number of the information objects retrieved is one.

8. A non-transitory computer readable medium storing a program for causing a computer to execute a process for information processing, the process comprising:

storing one or more information objects, in an information space memory, in association with an arrangement destination coordinate at which the information object is positioned in an information space;

generating, by an information space screen generation section, an information space screen which displays each information object, among the one or more information objects, stored in the information space memory positioned at a corresponding arrangement destination coordinate;

receiving, on the information space screen being displayed, an instruction given by a user to change the arrangement destination coordinate of the information object displayed on the information space screen or an instruction given by the user to specify a new information object and an arrangement destination coordinate of the new information object in the information space, and updating information stored in the information space memory by an update section, correspondingly to a received changing instruction or a received specifying instruction;

displaying, by a retrieval condition receiving section, a supplemental screen superposed in the information space screen having an input field to receive an input of a retrieval condition from a user, the retrieval condition including a search query character string;

retrieving a first information object, among the one or more information objects, which matches the search query character string; and controlling, in response to the search query character string, the information space screen generation section to generate the information space screen in which the first information object is displayed in a display form different from all other information objects, among the one or more objects, that were not received by the retrieval section.

* * * * *